United States Patent [19]

Nickel et al.

[11] 4,411,942
[45] Oct. 25, 1983

[54] PACKING FOR TECHNICAL PROCESSES

[75] Inventors: Andreas Nickel, Hagen; Karl H. Reissinger, Leverkusen; Hans-Walther Brandt, Odenthal, all of Fed. Rep. of Germany; Thomas Melin, Berkeley, Calif.

[73] Assignee: Bayer Aktiengesellschaft, Leverkusen, Fed. Rep. of Germany

[21] Appl. No.: 315,382

[22] Filed: Oct. 27, 1981

[30] Foreign Application Priority Data

Nov. 18, 1980 [DE] Fed. Rep. of Germany ....... 3043420
Dec. 24, 1980 [DE] Fed. Rep. of Germany ....... 3048968

[51] Int. Cl.$^3$ .............................................. B32B 3/10
[52] U.S. Cl. ........................... 428/137; 261/DIG. 72; 261/94; 428/131; 428/134; 428/162; 428/163; 428/181; 428/185; 428/222
[58] Field of Search ............... 428/222, 137, 162, 163, 428/131, 134, 181, 185; 261/DIG. 72, 94

[56] References Cited

U.S. PATENT DOCUMENTS 3,846,215 11/1974 Maistre ................................ 428/222
4,186,159 1/1980 Huber ......................... 261/DIG. 72

FOREIGN PATENT DOCUMENTS 2301281 9/1976 France .

Primary Examiner—James J. Bell
Attorney, Agent, or Firm—Sprung, Horn, Kramer & Woods

[57] ABSTRACT

Packing consisting of a plurality of twisted strips stacked parallel to each other in an axially symmetrical arrangement. Twisting produces spirals rotating in the same sense. In addition, the strips are pleated to produce waves perpendicular to the axis of the spiral. When the packing is assembled from the spirals, the individual spirals are staggered in relation to each other to form continuous channels extending in straight lines in four axially symmetric directions. The axially symmetric directions are defined in that their projections in the horizontal plane form an angle of 90° with each other and an angle α formed between the said axially symmetric directions and the axis of symmetry of the packing depends solely on the ratio of the widths of the spirals to their pitch.

9 Claims, 7 Drawing Figures

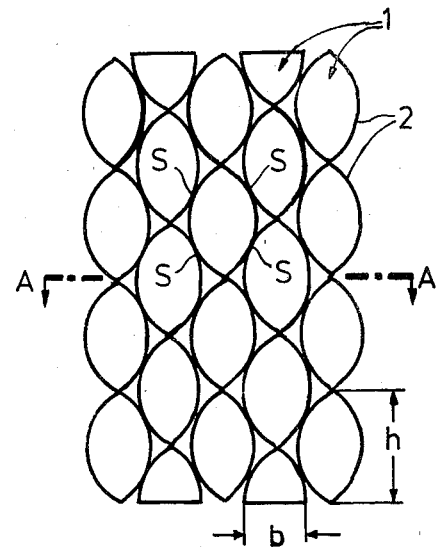
FIG. 1
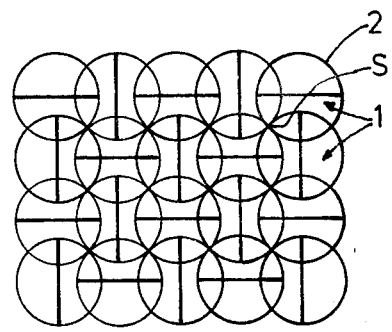
FIG. 2 (A-A)
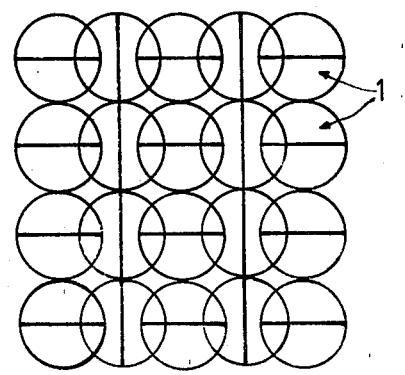
FIG. 3

PACKING FOR TECHNICAL PROCESSES

BACKGROUND OF THE INVENTION

This invention relates to a packing for installation in columns or pipes through which a fluid flows with the purpose of exchange of material. The main technical fields of application are: rectification, absorption, mixing, heat transfer and deposition of particles and droplets. The packing described here consists of a plurality of twisted strips layered parallel to each other in an axially symmetric arrangement. Such inserts for apparatus have been disclosed in French Pat. No. 2 301 281 and published European Application No. 0 011 176. Although these devices have been found to be quite satisfactory in practice, they have the disadvantage of relatively low mechanical stability when manufactured from fabric. Such a packing is readily deformed when installed or removed and thereby damaged. The damage produced is frequently not externally recognizable and only discovered by the substantially reduced efficiency in operation. In known packings, the individual elements, i.e. the twisted strips (spirals) are either mechanically connected by webs, bands or wires, or directly soldered or welded together at the point of contact of the strips. Such connections require a complicated and therefore expensive manufacturing technique.

SUMMARY OF THE INVENTION

It is an object of the present invention to provide a packing which is mechanically highly stable, easily manufactured and highly efficient in operation.

This problem is solved using a packing consisting of a plurality of twisted strips stacked parallel to each other in an axially symmetric arrangement. According to the invention, the strips are pleated and twisted into spirals of the same rotational sense and the spirals are staggered in relation to each other so that a group of continuous channels each extending in a straight line are formed in four axially symmetric directions (Z1-Z4) whose projections in the horizontal plane form an angle of 90° with each other and whose angle $\alpha$ to the axis M is defined by the formula $\tan \alpha = b/h \cdot \sqrt{2}$, where h is the pitch and b the width of the spiral.

The spirals preferably all have the same pitch h and the same width b. In that case, when the spirals are placed together there are four points S within each pitch at which the edges of four adjacent spirals meet.

The starting material for the spirals preferably consists of perforated strips or strips of woven material.

As regards pleating, optimum results are obtained when the height of the pleats is that a tooth profile of modulus 0.5 to 2.

The packing geometry obtained by the arrangement of spirals according to the invention is of particular interest. It results in a plurality of channels extending in an orderly arrangement in axially symmetric directions. Such channels do not occur in previously known spiral packings. When the packings are used for the exchange of materials between liquids and gases or liquids and vapors, these channels effect a high degree of transverse mixing of the gaseous or vapor phase and in extraction or mixing processes they effect a high degree of transverse mixing of the disperse phase. A high degree of efficiency is thereby obtained. The channels are thus essential for the advantageous effect of the invention. Another surprising feature is that exceptionally high mechanical stability is obtained without any mechanical connections between the spirals (e.g. by soldering, welding or webbing).

The invention is described below with the aid of exemplary embodiments illustrated schematically in the drawings, in which:

BRIEF DESCRIPTION OF THE DRAWINGS

FIG. 1 is an elevational view of the packing;

FIG. 2 is a section through the packing taken along A—A of FIG. 1;

FIG. 3 is a plan view of an alternative packing geometry;

DETAILED DESCRIPTION OF THE INVENTION

Figure 6:
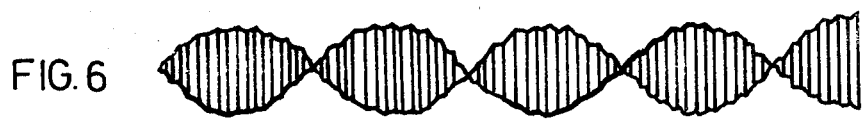
FIG. 6 shows a pleated strip twisted to form a spiral.

In FIGS. 1 and 2, strips which have been twisted into spiral 1 are stacked together in an axially symmetric arrangement. Each spiral 1 has four points of contact S with adjacent spirals within one pitch h. At each of these points of contact S, edges 2 of four spirals intersect (see FIG. 2). In this arrangement, there are no points of contact between the edges 2 of strips and the axes of spirals (see FIG. 2). As shown in FIG. 6, pleated strips for which sheet metal, woven material or thermoplastic material are used as starting material, are twisted into spirals 1. The pleats have been omitted in FIG. 1 to simplify the drawing. It has surprisingly been found that the pleated spirals 1 jam together at their points of contact S, whereby a very stable packing is obtained and the points of contact S are fixed. Due to the high density of the packing geometry and the nature and large number of points of contact S, a degree of efficiency in the exchange of materials between legands and vapors is obtained which has not been achieved with the previously known packings of the state of the art described above.

Figure 4:
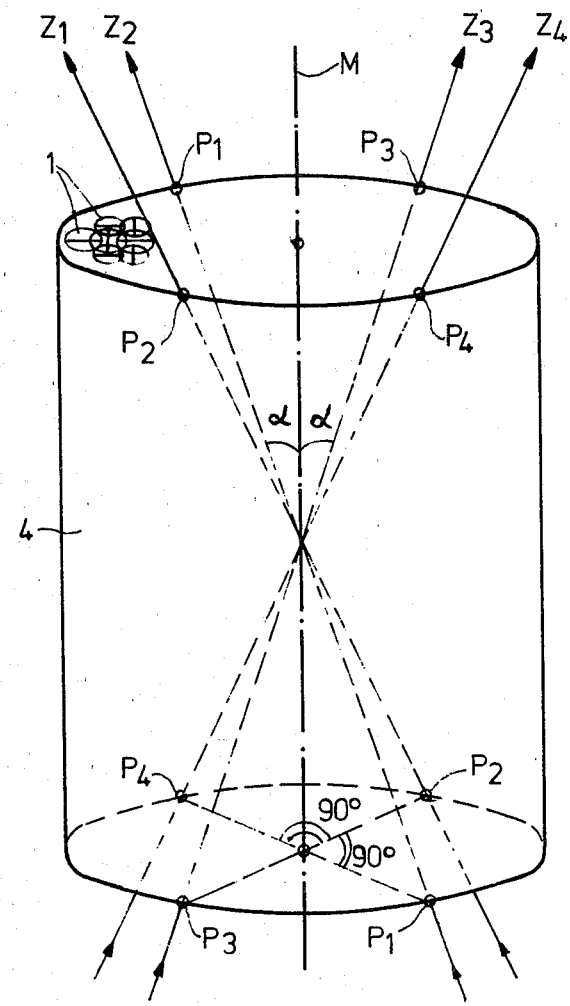
FIG. 4 shows the principal directions Z 1 to Z4 of oblique channels in the packing.
Figure 7:
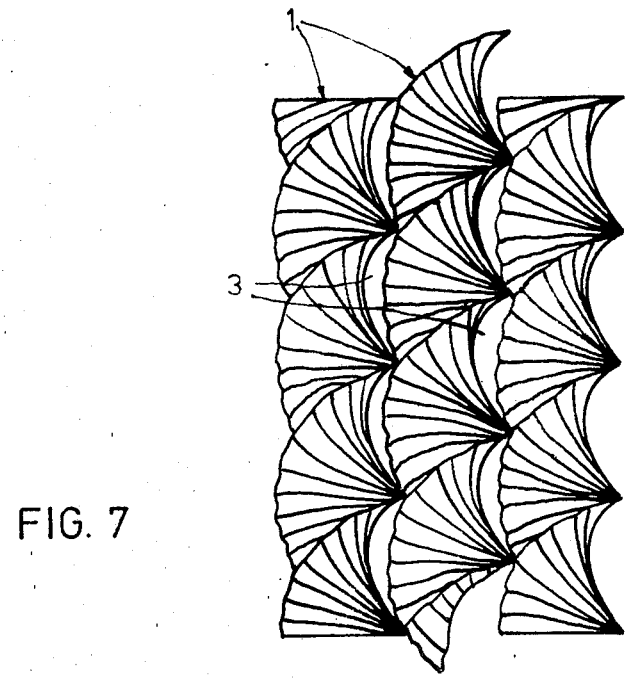
FIG. 7 shows a plurality of oblique channels formed from pleated strips.

A plurality of oblique channels 3 (see FIG. 7) having the geometrical arrangement illustrated in FIG. 4 is another characteristic feature of the new packing. The channels 3, which are approximately half-moon shaped in cross-section, extend parallel to the axially symmetrical directions Z 1 to Z 4. Four groups of channels corresponding to the four directions Z1 to Z4 are thus formed, with all the channels within a group situated parallel to each other. In FIG. 4, the spirals 1 stacked parallel with the axis M of the packing are indicated in the upper lefthand corner. The cylinder enveloping the packing is indicated by the reference numeral 4.

The points at which the directions Z1 to Z4 of the channels meet the upper and lower circular area of the cylindrical packing are indicated by reference P 1, P 2, P 3 and P 4. The projections of the directions Z1 to Z 4 in the horizontal plane form an angle of 90°. The angle $\alpha$ between the directions Z 1 to Z 4 and the axis M of the packing is defined by $\tan \alpha = b/h \cdot \sqrt{2}$, where h is the pitch and b the width of the spiral 1 (see FIG. 1). Projection of all the channels 3 in a horizontal plane (i.e. a plane perpendicular to the axis M) therefore produces a rectangular grid. The geometry of the packing is uniquely defined by this relationship and the relationship of the angle defined above. The intensity of twisting is defined by the ratio h/b. In practice, h/b is preferably in the range of from 1 to 5 ($1 \leq h/b \leq 5$). This means that the directions of the continuous channels are within the range of $\alpha = 55°$ to $\alpha \leq 15°$ ($15° \leq \alpha \leq 55°$). The angular relationship indicated above naturally applies only to the ideal case. Slight deviations may occur in the event of distortion of the regular arrangement, e.g. by deformation.

An alternative embodiment of the invention is illustrated in FIG. 3. Although the packing geometry is considerably different from that of FIGS. 1 and 2, the oblique channels 3 are again obtained. The packing in this case consists of parallel layers of axially symmetric spirals arranged in alignment and staggered in relation to each other by h/2. In this case, therefore, six points of contact occur within each pitch h, at each of which two adjacent spirals touch at their edges. The total number of points of contact is thus less than in the packing according to FIGS. 1 and 2, and the degree of efficiency in technical processes is therefore somewhat lower.

Figure 5:
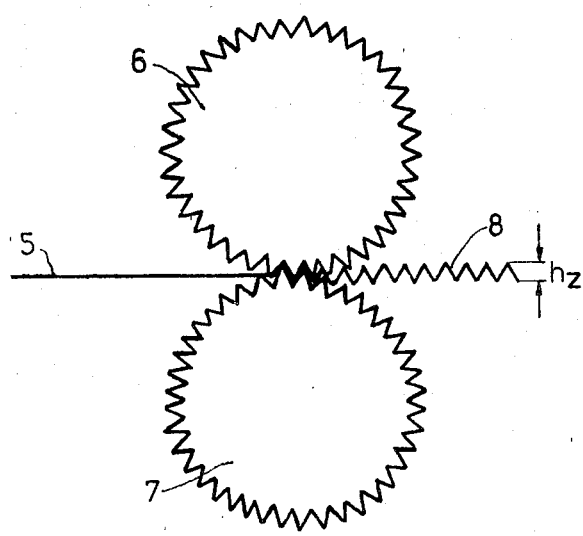
FIG. 5 illustrates a device for producing pleats in the strips.

The processes of pleating and twisting are illustrated in FIGS. 5 and 6. As shown in FIG. 5, a strip of sheet metal 5 passes between two meshing toothed wheels 6 and 7 so that the strip 5 is pleated perpendicular to its direction of transport and hence also perpendicular to its axis. The height $H_z$ of the pleat, i.e. the amplitude of the corrugation, corresponds to the profile of the teeth of the wheels 6 and 7. The best results were obtained with a pleating height of $H_z$, which corresponds to a tooth profile of modulus 0.5 to 2. The resulting pleating of the untwisted strip obtained is then substantially that of an equilateral triangle of sides 1 to 3 mm in profile. The spiral 1 is produced by twisting the pleated strip 8. This twisting slightly flattens the pleating at the edges. (see FIG. 6).

By pleating the strips and arranging the spirals 1 as shown in FIGS. 1 and 2, even a packing of sheet metal spirals provides a degree of wetting which in other, known packings could only be achieved with a complicated and costly woven structure (brading or twill weave).

When a linen weave was used for the packing according to the invention and made up into strips 14 mm in width, pleated to correspond to a tooth modulus 1 and twisted to a spiral of pitch 25 mm, the efficiency of separation obtained was far greater than that obtained with the above mentioned packings known in the art.

We claim:

1. In a packing for fluid treatment, the improvement comprising: a plurality of twisted strips stacked parallel to each other in an axially symmetric arrangement, wherein the strips are pleated perpendicular to the axis of the strip and twisted in the same rotational sense and the twisted strips are staggered in relation to each other to form groups of continuous channels, each group extending in a straight line in four axially symmetric directions whose projections in a horizontal plane form an angle of 90° with each other and whose angle $\alpha$ with respect to the longitudinal axis of the packing is tan $\alpha = b/h \cdot \sqrt{2}$, where h is the pitch and b the width of the twisted strips.

2. The packing according to claim 1, wherein the twisted strips have the same pitch and the same width and wherein within each pitch there are four points where the edges of four adjacent twisted strips meet.

3. The packing according to claim 1 or 2, wherein the strips are perforated.

4. The packing according to claim 3, wherein the strips comprise a woven material.

5. The packing according to claim 1, wherein the height of the pleats corresponds to a tooth profile of modulus 0.5 to 2.

6. A method of producing a packing for fluid treatment comprising the steps of: providing a plurality of twistable strips, pleating the strips perpendicular to the axis thereof, twisting the strips into in the same rotational sense and stacking the twisted strips parallel to each other in an axially symmetric arrangement without any mechanical interconnection between the twisted strips by staggering the twisted strips in relation to each other to form groups of continuous channels with each group extending in a straight line in four axially symmetric directions whose projections in a horizontal plane form an angle of 90° with each other and whose angle $\alpha$ with respect to the longitudinal axis of the packing is defined by tan $\alpha = b/h \cdot \sqrt{2}$, where h is the pitch and b the width of the twisted strips.

7. The method according to claim 6, wherein the step of twisting comprising forming the twisted strips with the same pitch and the same width such that within each pitch there are four points where the edges of four adjacent twisted strips meet.

8. The method according to claims 6 or 7, further comprising perforating the strips.

9. The method according to claim 6, wherein the step of pleating comprise forming the height of the pleats to correspond to a tooth profile of modulus 0.5 to 2.

* * * * *